United States Patent Office 3,467,645
Patented Sept. 16, 1969

3,467,645
WATER-SOLUBLE DISAZO DYESTUFFS
Heinz Keller, Muttenz, and Hans Grossmann, Oberwil, Switzerland, assignors to Durand & Huguenin A.G., Basel, Switzerland
No Drawing. Filed Nov. 6, 1964, Ser. No. 409,589
Claims priority, application Switzerland, Nov. 8, 1963, 13,776/63; Aug. 14, 1964, 10,635/64
Int. Cl. C09b 31/00, 45/24, 39/00
U.S. Cl. 260—174                                    1 Claim

ABSTRACT OF THE DISCLOSURE

Water-soluble metallizable disazo and trisazo dyestuffs corresponding to the general formula

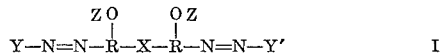

wherein X denotes the direct bond, the radical of a hydrocarbon having 1-7 carbon atoms or a bridge of the formula —CO—, —O—, —S—, —$SO_2$—, —NH—, —NHCONH—, —NHCSNH—, —NHCO— —$NHSO_2$—, —N=N—, Y and Y' denote the radical of a coupling component comprising the ortho-hydroxycarboxy benzene grouping, which coupling component is selected from the series of the acetoacetamides, 5-pyrazolones, benzenes and naphthalenes coupling in ortho-position with respect to a hydroxyl group, Z denotes a hydrogen atom or the group —$SO_3H$ and R denotes a benzene radical in which the OZ group is in ortho position to the azo group and X is in meta or para position to the azo group and to the group OZ, the dyestuff molecule containing at least 2 groups of the formula —$SO_3H$.

One representative of dyestuffs of Formula I is produced by tetrazotizing diamines of the general formula

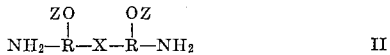

wherein R, X and Z have the above said meanings, and allowing them to react with the coupling components comprising the ortho-hydroxy-carboxy benzene grouping, which coupling components are selected from the series of acetoacetamides, 5-pyrazolones as well as benzenes and naphthalenes coupling in ortho position with respect to a hydroxyl group.

---

The invention relates to new, water-soluble, metallizable disazo and trisazo dyestuffs corresponding to the general formula

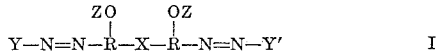

wherein X denotes the direct bond, the radical of a hydrocarbon having 1-7 carbon atoms or a bridge of the formula —CO—, —O—, —S—, —$SO_2$—, —NH—, —NHCONH—, —NHCSNH—, —NHCO, —$NHSO_2$—, —N=N—, Y and Y' denote the radical of a coupling component comprising the orthohydroxycarboxy benzene grouping, which coupling component is selected from the series of the acetoacetamides, 5-pyrazolones, benzenes and naphthalenes coupling in ortho-position with respect to a hydroxyl group, Z denotes a hydrogen atom or the group —$SO_3H$ and R denotes a benzene radical in which the OZ group is in ortho position to the azo group and X is in meta or para position to the azo group and to the group OZ, the dyestuff molecule containing at least 2 groups of the formula —$SO_3H$.

One representative of dyestuffs of Formula I is the dyestuff of the formula

It is already known to produce metallizable disazo and trisazo dyestuffs by tetrazotizing aromatic diamines containing a hydroxyl group or sulfuric acid semi-esters thereof in ortho position to the amino groups and joining them with 5-pyrazolones, preferably with naphthols, which couple in ortho position to a hydroxyl group. A further known method consists in allowing agents, which are capable of withdrawing heavy metals from heavy metals-containing compounds, to react with disazo or trisazo dyestuffs which contain such heavy metals, in particular copper in complex form, and which were obtained by using tetrazotized diamines as starting products.

It has now been found that new and particularly valuable water-soluble, metallizable disazo and trisazo dyestuffs of Formula I are obtained by tetrazotizing diamines of the general formula

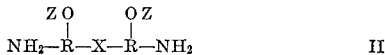

wherein R, X and Z have the above said meanings, and allowing them to react with the coupling components comprising the ortho-hydroxy-carboxy benzene grouping, which coupling components are selected from the series of acetoacetamides, 5-pyrazolones as well as benzenes and naphthalenes coupling in ortho position with respect to a hydroxyl group.

Dyeings can be produced with the dyestuffs obtainable according to the invention which, compared to dyeings produced with comparable known dyestuffs, are superior primarily with regard to fastness to wetting.

The following compounds are examples of suitable diamines for this process: 3,3'-dihydroxy-4,4'-diaminodiphenyl, 4,4'-dihydroxy-3,3'-diamino-diphenyl, 4,4'-dihydroxy - 3,3' - diamino - diphenylmethane, 4,4' - dihydroxy -3,3' - diamino - diphenyl - 1,1 - cyclohexane, 4,4'-dihydroxy - 3,3' - diamino - diphenyl - 1,1 - ethane, 4,4'-dihydroxy - 3,3' - diamino - diphenyl - 2,2 - propane, 4,4'-dihydroxy-3,3'-diamino - diphenylsulfone and disulfuric acid semi-esters thereof. The tetrazotization of the diamines of Formula II can be effected according to known methods.

Suitable coupling components according to the definition given are those whose ortho-hydroxycarboxy benzene grouping, which may be further substituted if desired, is itself capable of coupling, such as 2,4- and 2,5-dihydroxy benzoic acid, or is bonded across a bridge to a coupling component conventional in azo chemistry. Numerous compounds of this kind are already known or can be produced by methods known per se. The following typical examples may be mentioned: 5-acetoacetylamino-2-hydroxy-benzoic acid, 1-(4'-hydroxy-3'-carboxyphenyl)-3-methyl - 5 - pyrazolone, 1-(4'-hydroxy-3'-carboxybenzene sulfonylamino) - 8 - naphthol - 3,6 - disulfuric acid, 2-(4'-hydroxy - 3' - carboxy - phenylamino) - 5 - naphthol - 7-sulfonic acid, 2-naphthol-6-sulfonic acid-(3'-hydroxy-4'-carboxyphenyl) - ester, 2 - (4 - hydroxy - 3 - carboxyphenyl) - 5' - hydroxy - (naphthol - 1',2':4,5-triazol) - 7'-sulfonic acid.

The coupling of the tetrazo compounds with the coupling components as defined is effected according to methods known per se. In order to obtain better coupling and/or better water-solubility of the coupling products it is often advisable to use the disulfuric acid semi-esters of the o,o'-dihydroxydiamines.

A further process for preparing dyestuffs of Formula I consists in treating by conventional methods disazo or trisazo dyestuffs containing heavy metals, which comprise

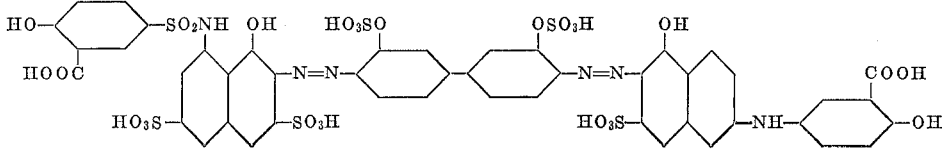

complex-bound copper preferably on the azo bridge and, when unmetallized, correspond to Formula I (Z=H) with agents capable of withdrawing heavy metals, for example with the aid of sulfide ions or concentrated mineral acids. The heavy metal complexes used as starting substances in this process are obtained, for example, by the dealkylating or dehalogenating action of agents capable of withdrawing heavy metals, in particular copper yielding agents, on coupling products resulting from tetrazotized o,o'-dialkoxy- or o,o'-dihalodiamines and coupling components according to the definition given. Suitable diamines of this type are, for example, 1,1-(3,3'-dimethoxy-4,4'-diaminodiphenyl)-cyclohexane, 3,3'-dichloro-, 3,3'-diethoxy-, and preferably 3,3'-dimethoxy-4,4'-diaminodiphenyl. A particularly advantageous process for preparing the copper complexes used as starting substance consists in many cases in allowing an oxidizing agent and a copper-yielding compound to act simultaneously in known manner on disazo dyestuffs obtained from tetrazotized diamines being free in ortho position of complex-forming groups and from the defined coupling components, thus introducing a second hydroxyl group in ortho position to each azo bridge. This process is employed especially when the corresponding diamines containing in ortho position, a hydroxyl group or a substituent convertible into a hydroxyl group are not available or only difficultly available or when the coupling does not take place in the desired manner.

The following compounds are, for example, suitable diamines for the latter said process: 4,4'-diamino-diphenyl-oxide, 4,4'-diamino-diphenyl-sulfide, 4,4'-diamino-diphenyl - urea, 4,4'-diamino-diphenyl-thiourea, 4,4' - diamino - diphenyl - methane, 4,4' - diamino - diphenyl-1,1 - cyclohexane, 4,4' - diamino - diphenyl - 2,2 - propane, 4,4'-diaminotriphenylmethane, 4,4'-diaminobenzophenone, 3,3'-, 4,4'-, or 3,4'-diaminobenzanilide, 3,3'-, or 3,4'-diaminobenzenesulfanilide, 4,4'-diaminodiphenyl-disulfonic acid, 4,4'-diaminodibenzyl-disulfonic acid, 4,4'-diaminostilbene-2,2'-disulfonic acid, 4,4'-diaminoazobenzene.

In the disazo and trisazo dyestuffs of Formula I, Y and Y' may be the same or different according to whether 1 mole of a tetrazotized diamine is combined with 2 moles of the same coupling component or stepwise with 1 mole each of two different coupling components.

The starting substances are selected according to the invention such that the resulting disazo dyestuffs contain at least two groups of the formula —SO₃H present as sulfonic acids and/or as sulfuric acid semi-esters. The dyestuffs of Formula I are further obtained also by allowing sulfonating or sulfatizing agents to react with dyestuffs of Formula I which, if desired, may be free of SO₃H groups.

The metallizable disazo and trisazo dyestuffs of Formula I which are obtainable according to the invention are generally readily water-soluble. They are suitable for dyeing and printing the most varied materials, such as leather, anodically produced oxide layers on aluminum, animal, vegetable and synthetic textile fibers, particularly cellulosic fibers such as cotton, linen, rayon or staple fibre from regenerated cellulose. The dyeings are considerably improved with regard to their general fastness properties by the action of agents yielding heavy metals, preferably yielding chromium or copper. An advantageous application process consists in allowing chromium- and copper-yielding agents to act simultaneously or subsequently on the dyeing. For example, a material pretreated with chromium-yielding compounds can be dyed and thereafter cuprated or a direct dyeing can be subsequently treated in an aqueous bath containing a mixture of chromium- and copper-yielding agents. A particularly suitable process for the application of the inventive dyestuffs consists in applying a printing paste prepared in conventional manner containing inter alia a dyestuff of Formula I and a chromium-yielding compound to a fabric and treating this latter after drying and steaming in a bath containing a copper-yielding compound. When using special copper-yielding compounds, for example copper rhodanide, the copper-yielding compound can also be added to the printing paste in chrome printing, a post-treatment thereby becoming superfluous. The chromium preferably enters in the ortho-hydroxycarboxyl and the copper preferably in the o,o'-dihydroxy azo group, any sulfuric acid semi-esters present being simultaneously split. The dyeings obtained in this manner are characterized generally by good light fastness, particularly however by very good fastness to wetting.

Heavy metal complexes of dyestuffs of Formula I can further also be prepared in substance according to generally known methods. By heavy metals such metals are to be understood which are capable of forming stable metal chelates with the dyestuffs of Formula I, for example manganese, iron, nickel, and particularly chromium, cobalt and copper.

A particularly suitable process consists in treating dyestuffs of Formula I in substance with heavy metal yielding agents. Heavy-metal-yielding compounds are, for example, the hydroxides, oxides, halides, sulfates, nitrates and acetates of the said heavy metals. However, compounds can also be used which contain the metals in complex form, for example oxalates, tartrates, salicylates and amino complexes. The treatment of the dyestuffs with heavy metal-yielding agents can be effected both in aqueous medium at various pH-values and in an organic solvent such as formamide, dimethylformamide, ethylene glycol and ethers thereof. The metallization is advantageously effected in the heat, open or under pressure, for example at boiling temperature of the reaction mixture, with or without the addition of agents affecting the complex formation, for example alcohols, pyridines, alkanolamines. In the event that the metal present in the heavy metal-yielding agent has a different valence the reaction can be performed in the presence of a reducing agent or oxidizing agent, respectively, such, for example, as is the case, when chromating with chromates in the presence of glucose. The reaction mixture can be present in the form of a solution, suspension or paste. The conversion into the metal complex compound can also take place with a dyestuff such as is present in the coupling mixture. If desired, mixtures of various dyestuffs can be treated with heavy metal-yielding agents or one dyestuff can be treated with a mixture of heavy metal-yielding agents.

The dyestuffs of Formula I are characterized inter alia by comprising two different types of chelate-forming groups. According to the type of dyestuff, of the heavy metal-yielding agent and the reaction conditions, such as e.g. pH-value of the reaction mixture or ratio of compounds employed, the heavy metal is complex-bonded to both o,o'dihydroxyazo and/or to both o-hydroxycarboxy groups. The ratio of metal to chelate-forming group in the metal complex can be 1:1 or 1:2.

The conditions are advantageously selected such that water-soluble dyestuffs are formed which contain the heavy metal in complex form with the o,o'-dihydroxyazo groups and whose o-hydroxycarboxy groups are exempt of heavy metal. Such dyestuffs are further obtained by treating dyestuffs containing complex-bonded heavy metal on both chelate-forming groups with compounds which withdraw complex-bonded metal only from the o-hydroxycarboxy groups but not from the o,o'-dihydroxyazo groups. Such compounds are e.g. sarcosine, ethylene diamine tetraacetic acid and nitrilotriacetic acid.

The heavy metal complex dyestuffs of the invention are also obtained according to the methods cited hereinbefore, such as e.g. action of heavy metal-yielding agents on o-alkoxy or o-halo-o'-hydroxyazo dyestuffs or by the action of copper-yielding agents on o-hydroxyazo dyestuffs in the presence of an oxidation agent.

Particularly valuable dyestuffs are obtained by allowing agents yielding a coordinative hexavalent metal, particularly cobalt or chromium, to react in such manner with dyestuffs of Formula I that one atom of metal complex-binds two o,o'-dihydroxyazo groups.

The heavy metal complexes of Formula I obtainable according to the invention are suitable for dyeing the most varied materials, such as anodically produced oxide layers on aluminum, leather, animal, vegetable and synthetic textile fibers, especially cellulosic fibers such as cotton, linen, rayon and staple fiber. Insofar as the metal complex compounds also comprise free chelate-forming groups, the dyeings thereof can be improved by an after-treatment on the fiber with heavy metal-yielding agents. In particular, the dyestuffs of Formula I which contain complex-bonded metal only on the o,o'-dihydroxyazo group are suitable for the so-called chrome printing. Dyeings are obtained which are primarily characterized by excellent fastness to light, water and washing.

The invention will be described by reference to the following examples, but is not intended to be restricted thereto. In the examples, all parts are parts by weight and the temperature is given in degrees centigrade.

Example 1

37.6 parts of disulfuric acid semi-ester of 3,3'-dihydroxy-4,4'-diaminodiphenyl are neutralized in 350 parts of water, diluted with 13.8 parts of sodium nitrite and flowed into a mixture of 200 parts of sodium chloride, 400 parts of finely ground ice and 58 parts of hydrochloric acid (33%). The suspension is stirred at —5° until the tetrazotization is terminated and an ice cold solution of 51.9 parts of 1-(4'-hydroxy-3'-carboxybenzene sulfonylamino)-8-naphthol-3,6-disulfonic acid and 54 parts of sodium hydroxide solution (31%) in 300 parts of water is then added. After 30 minutes a mixture of 37.5 parts of 2 - (4' - hydroxy - 3' - carboxyphenylamino) - 5-naphthol-7-sulfonic acid, 27 parts of sodium hydroxide solution (31%) and 150 parts of water is added. One first stirs while cooling, then at room temperature, until the coupling is terminated, heats to 60° and separates off the disazo dyestuff by the addition of sodium chloride. The dyestuff is obtained pure by dissolving and precipitating from aqueous alcohol and water.

In the form of the free acid it corresponds to the formula

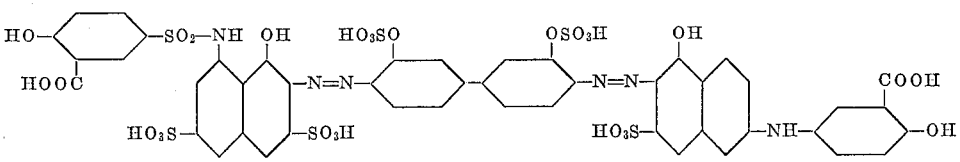

and dissolves in water to give a bluish violet colour, in concentrated sulfuric acid to give a greenish blue colour and in diluted sodium hydroxide solution to give a reddish violet colour.

2 parts of this dyestuff and 10 parts of urea are dissolved warm in 32 parts of water and stirred into 50 parts of a tragacanth thickener (5%). After cooling, 6 parts of an aqueous chromium acetate solution containing 6% chromium are added and the paste is printed on a cotton fabric. After drying, steaming for 8 minutes and rinsing, the fabric is after-treated for one minute at 80° in a bath containing 0.5% of crystallized copper sulfate and 0.3% of acetic acid, and finally treated in the conventional way. A navy blue dyeing is obtained which is characterized by excellent fastness to light and very good fastness to washing.

Substantially the same dyeing is obtained if the corresponding sulfuric acid ester-free dyestuff is employed.

Example 2

A mixture of 75 parts of 2-(4'-hydroxy-3'-carboxyphenylamino)-5-naphthol-7-sulfonic acid, 80 parts of sodium hydroxide solution (31%), 50 parts of α-picoline, 10 parts of the sodium salt of naphthalene-2-sulfonic acid and 300 parts of water is introduced at 0° into a tetrazo suspension produced according to Example 1 from 37.6 parts of disulfuric acid semi-ester of 3,3'-dihydroxy-4,4'-diaminodiphenyl. One first stirs while cooling, then at room temperature, until the coupling is terminated. The dyestuff is separated off by the addition of sodium chloride, filtered and purified by dissolving and precipitating from aqueous alcohol.

The resulting dyestuff corresponds in the form of the free acid to the formula

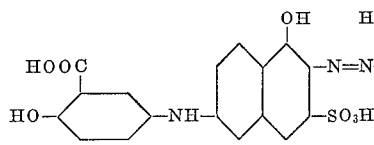 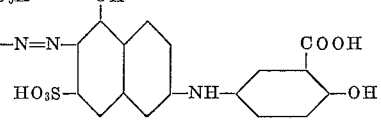

and dissolves in water to give a bluish violet colour, in concentrated sulfuric acid to give a greenish blue colour and in diluted sodium hydroxide solution to give a reddish violet colour. The dyestuff dyes cotton directly with bluish violet colour. By an after-treatment of the dyeing for 20 minutes at 90° in a bath containing 1% of potassium bichromate, 1% of crystallized copper sulfate and 1% of 80% acetic acid, a navy blue dyeing having excellent fastness properties to light and washing is obtained.

Example 3

37.6 parts of the disulfuric acid semi-ester of 4,4'-dihydroxy-3,3'-diamino-diphenyl are tetrazotized in analogous manner to Example 1. A mixture of 36 parts of 2,4-dihydroxy benzoic acid, 40 parts of sodium carbonate, 30 parts of sodium bicarbonate and 200 parts of water is added at —5° to the tetrazo suspension. After termination of the coupling the precipitated dyestuff is filtered.

The resulting dyestuff corresponds in the form of the free acid to the formula

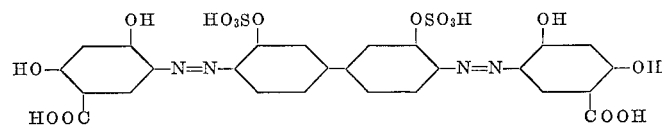

and dissolves in water to give a brownish red colour, in concentrated sulfuric acid to give a dark reddish brown colour. The dyestuff yields in chrome printing on staple fibre after-coppered according to Example 1, a brownish violet dyeing having very good fastness properties.

A dyestuff having similar properties is obtained if 2,5-dihydroxy benzoic acid is used instead of 2,4-dihydroxy benzoic acid.

The disulfuric acid semi-ester of 4,4'-dihydroxy-3,3'-

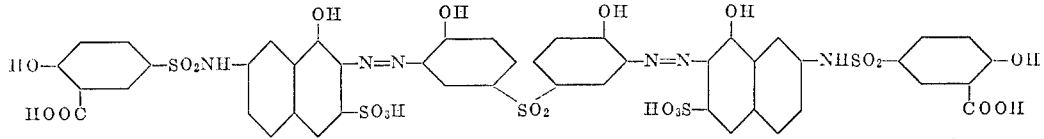

diaminodiphenyl used in this example is prepared as follows: 27.6 parts of 3,3'-dinitro-4,4'-dihydroxydiphenyl (prepared by nitrating 4,4'-dihydroxy-diphenyl) are introduced into a mixture of 280 parts of chlorosulfonic acid and 1400 parts of α-picoline, heated for 4 hours at 80° and thereupon flowed within one hour at boiling temperature into a mixture of 400 parts of pulverized iron, 400 parts of water and 30 parts of hydrochloric acid (33%). The reduction mixture is then rendered alkaline to phenolphthaleine by sprinkling in sodium carbonate and filtered boiling hot. The disulfuric acid semiester is separated off by the addition of 100 parts of sodium chloride to the filtrate, filtered and dried.

Example 4

41.8 parts of the disulfuric acid semi-ester of 2,2-(4',4''-dihydroxy-3',3''-diaminodiphenyl)-propane are tetrazotized in analogous manner to Example 1 and introduced at 0° into a mixture of 46.8 parts of 1-(4'-hydroxy-3'-carboxy-phenyl)-3-methyl-5-pyrazolone, 80 parts of sodium carbonate and 600 parts of water. After termination of the coupling the dyestuff is separated off by the addition of sodium chloride and filtered.

The resulting dyestuff corresponds in the form of the free acid to the formula

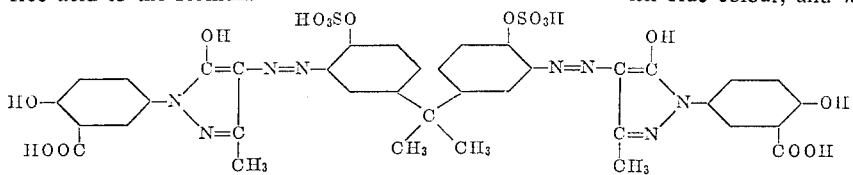

and dissolves in water to give a yellowish orange colour and in concentrated sulfuric acid to give a red colour. The dyestuff yields on cotton an orange dyeing having excellent fasteness to washing in chrome printing, when after-coppered. A golden yellow dyeing is obtained on anodically oxidized aluminium after sealing with nickel acetate.

Dyestuffs having almost the same properties are obtained by using the disulfuric acid semi-ester of 1,1-(4',4''-dihydroxy-3',3''-diamino-diphenyl)-ethane or -cyclohexane.

The disulfuric acid semi-ester used in this example is obtained in an analogous process to that described in Example 3 starting from 2,2-(3',3''-dinitro-4',4''-dihydroxydiphenyl)-propane by sulfating and reducing or by the action of chlorosulfonic acid in chloroform on 2,2-(4',4''-dihydroxy-3',3''-diaminodiphenyl)-propane.

Example 5

13.8 parts of sodium nitrite dissolved in 50 parts of water are allowed to drip at 10° into a mixture of 28 parts of 4,4'-dihydroxy-3,3'-diaminodiphenylsulfone, 50 parts of hydrochloric acid (33%) and 160 parts of water. After 30 minutes the tetrazo compound is filtered and introduced at room temperature into a mixture of 87.8 parts of 2-(4'-hydroxy-3'-carboxy-benzene-sulfonylamino)-8-naphthol-6-sulfonic acid, 55 parts of sodium hydroxide solution (31%) and 200 parts of water. After termination of the coupling the dyestuff is separated off by the addition of hydrochloric acid and converted into the sodium salt. The resulting dyestuff corresponds in the form of the free acid to the formula

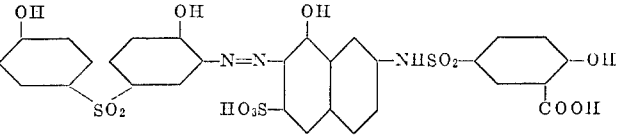

and yields in chrome printing on cotton a reddish violet dyeing having very good fastness to washing, when after-coppered.

The diamine used in obtained by nitrating and reducing 4,4'-dihydroxy-diphenylsulfone.

Example 6

A mixture of 11.7 parts of the disazo dyestuff from tetrazotized 3,3'-dimethoxy-4,4'-diamondiphenyl and 2-(N-4'-hydroxy-3'-carboxy-benzene sulfonyl - N - methylamino)-8-naphthol-6-sulfonic acid, 300 parts of water, 4.4 parts of diethanolamine, 8 parts of glycerine, 16 parts of ammonia (22%) and 5 parts of crystallized copper sulfate is refluxed for 50 hours. The o-hydroxycarboxy copper compound which first forms is thereby converted into the o,o'-dihydroxyazo copper compound, with the splitting off of the dimethoxy group. The resulting copper compound is filtered and 500 parts of water are diluted with a sodium sulfide solution at 40° until dissolved sulfide ions are detectable. After filtering the copper sulfide, the metal-free dyestuff is precipitated by the addition of sodium chloride, dissolved and precipitated from water and dried.

The resulting dyestuff corresponds in the form of the free acid to the formula

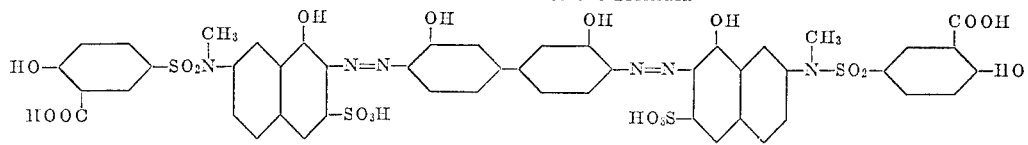

and dissolves in water, when concentrated, to give a greenish blue colour, and when diluted to give a reddish blue colour, whereas on dissolving the dyestuff in concentrated sulfuric acid it yields a greenish blue colour and in diluted sodium hydroxide solution a violet colour. The dyestuff yields in chrome printing on rayon a marine blue characterized by excellent fastness to light and very good fastness to washing when after-coppered in the way disclosed in the above Example 1.

Substantially the same dyestuff is obtained by heating in hydrochloric acid solution the disazo dyestuff obtained from tetrazotized disulfuric acid semi-ester of 3,3'-dihydroxy-4,4'-diaminodiphenyl and from the coupling component used in this example, the sulfuric acid ester groups being split hydrolytically.

Example 7

127.4 parts of the disazo dyestuff from tetrazotized 4,4'-diaminodiphenyl-2,2'-disulfonic acid and 4'-hydroxy-3' - carboxy - 2 - (3'' - methyl - 5'' - oxo - pyrazolin - 1''-yl)-diphenylsulfone-4-sulfonic acid are dissolved neutral in 1500 parts of water. After the addition of 50 parts of crystallized copper sulfate, 25 parts of hydrogen peroxide in 500 parts of water are allowed to drop in at 55°. The precipitated copper compound is demetallized with sodium sulfide as described in Example 6.

The resulting dyestuff corresponds in the form of the free acid to the formula

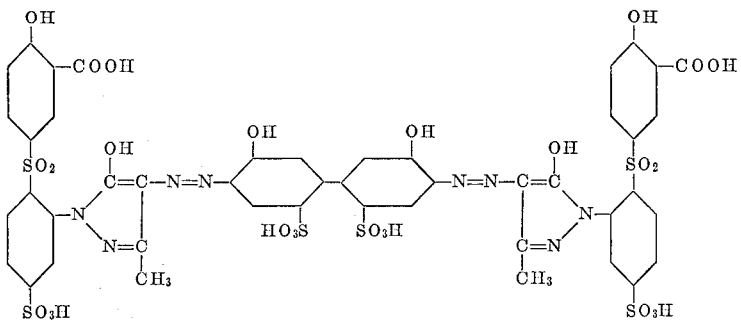

and yields, in chrome printing on cotton and when after-coppered, a brownish orange having good fastness properties to light and washing. The dyestuff dyes prechromated wool and silk, after-coppered, in brownish yellow shades.

If equivalent amounts of the disazo dyestuff from tetrazotized 4,4'-diaminostilbene-2,2'-disulfonic acid and 2-(4'-hydroxy - 3' - carboxybenzene sulfonylamino) - 8 - naphthol-6-sulfonic acid are used in this example, a dyestuff is obtained which yields, in chrome printing on cotton and when after-coppered, a violet dyeing. Dyestuffs having similar properties are obtained if the 4,4'-diaminostilbene-2,2'-disulfonic acid is replaced by 4,4'-diaminodibenzyl-2,2'-disulfonic acid or by 1,1-(4,4'-diaminodiphenyl) cyclohexane.

Example 8

65 parts of chlorosulfonic acid are allowed to drop into 600 parts of pyridine at 20–30° while cooling. Thereafter 95.6 parts of the disazo dyestuff from tetrazotized 3,3'-dihydroxy - 4,4' - diaminodiphenyl and 2 - (4' - hydroxy-3' - carboxy - benzene - sulfonylamino) - 7 - naphthol are introduced during one hour. One heats for 6 hours at 65°, pours the esterification mixture into soda solution (10%) and distills off the pyridine under vacuum. The precipitated dyestuff is filtered and dissolved and precipitated from water.

The resulting dyestuff corresponds in the form of the free acid probably to the formula

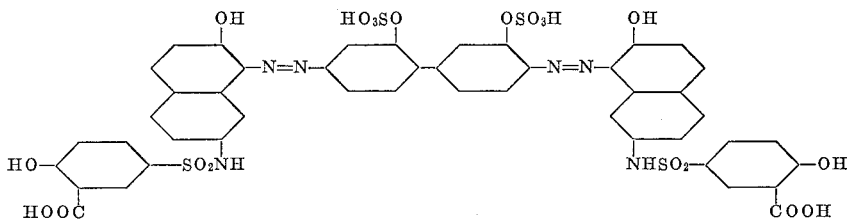

and dissolves in water to give a violet colour and in concentrated sulfuric acid to give a greenish blue colour.

A cotton fabric is impregnated with a mixture of 2 parts of this dyestuff, 10 parts of urea, 0.5 part of sodium chloride, 10 parts of a tragacanth thickener (6%), 4 parts of an aqueous chromium acetate solution containing 6% of chromium, and 80 parts of water. After drying, steaming for 8 minutes and rinsing, the fabric is after-coppered according to Example 1. A reddish blue dyeing having very good fastness to washing is obtained.

Further metallizable disazo dyestuffs obtained according to the processes described in the preceding examples are listed in the following table. In the column "Shade," the shade of the dyeing produced according to Example 1 on cotton is given.

TABLE

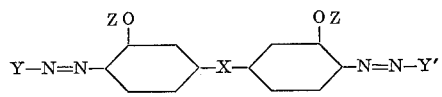

| Example | Y and Y' | Z | X | Shade |
|---|---|---|---|---|
| 9 | Y and Y':2,4-dihyroxybenzoic acid | $SO_3H$ | — | Greyish violet. |
| 10 | Y and Y':5-acetoacetylamino-2-hydroxybenzoic acid | $SO_3H$ | — | Brown. |
| 11 | Y and Y':4'-hydroxy-3'-carboxy-2-(3''-methyl-5''-oxopyrazolin-1''-yl)-diphenylsulfone-4-sulfonic acid. | $SO_3H$ | — | Reddish violet. |
| 12 | Y and Y':1-(4'-hydroxy-3'-carboxybenzenesulfonylamino)-8-naphthol-3,6-disulfonic acid | $SO_3H$ | — | Blue. |
| 13 | Y and Y':2-(4'-hydroxy-3'-carboxybenzenesulfonylamino)-5-naphthol-7-sulfonic acid | $SO_3H$ | — | Violet. |
| 14 | Y and Y':2-(4'-hydroxy-3'-carboxybenzenesulfonylamino)-8-naphthol-4,6-disulfonic acid. | $SO_3H$ | — | Blue. |
| 15 | Y and Y':1-(4'-hydroxy-3'-carboxybenzenesulfonylamino)-8-naphthol-4-sulfonic acid | $SO_3H$ | — | Turquoise blue. |
| 16 | Y and Y':2-(N-4'-hydroxy-3'-carboxybenzenesulfonyl-N-methylamino)-8-naphthol-6-sulfonic acid. | $SO_3H$ | — | Reddish blue. |
| 17 | Y and Y':3-(8-hydroxynaphthyl-1'-amino)-propionic acid-(4''-hydroxy-3''-carboxyphenyl-amide)-3',6-disulfonic acid. | $SO_3H$ | — | Bluish green. |
| 18 | Y and Y':2-(4'-hydroxy-3'-carboxybenzenesulfonylacetylamino)-5-naphthol-7-sulfonic acid. | $SO_3H$ | — | Reddish blue. |
| 19 | Y and Y':N'-4'-hydroxy-3'-carboxyphenyl-N-5-hydroxynaphthyl-(2)-urea-7-sulfonic acid | $SO_3H$ | — | Do. |
| 20 | Y and Y':5-(2-naphthol-6-sulfonylamino)-2-hydroxybenzoic acid | $SO_3H$ | — | Violet. |
| 21 | Y and Y':4-(2-naphthol-6-sulfonyloxy)-2-hydroxybenzoic acid | $SO_3H$ | — | Do. |
| 22 | Y:As in Example 12, Y':5-(1'-naphthol-4'-sulfonylamino)-2-hydroxybenzoic acid | $SO_3H$ | — | Blue. |
| 23 | Y:As in Example 14, Y':as in Example 21 | $SO_3H$ | — | Do. |
| 24 | Y:As in Example 12, Y':1-(4'-hydroxy-3'-carboxyphenyl)-5-pyrazolone-3-carboxylic acid. | $SO_3H$ | — | Reddish blue. |
| 25 | Y:As in Example 12, Y':as in Example 9 | $SO_3H$ | — | Bluish green. |
| 26 | Y and Y':1-(N-4'-hydroxy-3'-carboxybenzenesulfonyl-N-ethylamino)-8-naphthol-3,6-disulfonic acid. | H | — | Blue. |
| 27 | Y:5-acetoacetylamino-2-hydroxybenzoic acid-3-sulfonic acid, Y':As in Example 13 | H | — | Violet. |
| 28 | Y and Y':1-(3'-nitro-2'-methyl-4'-hydroxy-5'-carboxybenzene-sulfonylamino)-5-naphthol-7-sulfonic acid. | H | — | Blue. |
| 29 | Y:2-(N-4'-hydroxy-3'-carboxybenzenesulfonyl-N-8-hydroxy-6-sulfonaphthyl-2-amino)-ethane-1-sulfonic acid, Y':As in Example 20. | H | — | Do. |
| 30 | Y and Y':2-(4'-hydroxy-3-carboxyphenyl)-5-hydroxy-(naphto-1'-2':4,5-triazol)-7-sulfonic acid. | H | — | Navy blue. |

| Example | Y and Y' | Z | X | Shade |
|---|---|---|---|---|
| 31 | Y and Y':As in Example 13 | H | —O— | Violet. |
| 32 | Y and Y':5-acetoacetylamino-2-hydroxybenzoic acid-3-sulfonic acid | H | —CO— | Brown. |
| 33 | Y and Y':As in Example 16 | H | —SO$_2$— | Violet. |
| 34 | Y and Y':As in Example 13 | H | >C$_6$H$_{10}$ | Do. |
| 35 | Y and Y':As in Example 13 | H | —CH(C$_6$H$_5$)— | Do. |
| 36 | Y and Y':As in Example 11 | H | —CH$_2$— | Yellowish. |
| 37 | Y and Y':1-(4'-hydroxy-3'-carboxybenzenesulfonylacetylamino)-8-naphthol-3,6-disulfonic acid. | H | —HNCSNH— | Violet. |

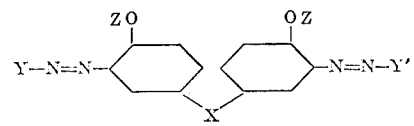

| Example | Y and Y' | Z | X | Shade |
|---|---|---|---|---|
| 38 | Y and Y':2-(4'-hydroxy-3'-carboxybenzenesulfonylamino)-8-naphthol-6-sulfonic acid | H | — | Bordeaux. |
| 39 | Y and Y':As in Example 11 | H | — | Reddish Brown. |
| 40 | Y and Y':1-(2'-hydroxy-3'-carboxyphenyl)-3-methyl-5-pyrazolone-5'-sulfonic acid | H | —SO$_2$— | Brownish yellow. |
| 41 | Y and Y':1-(5'-chloro-4'-hydroxy-3'-carboxybenzenesulfonylamino)-8-naphthol-3,6-disulfonic acid. | H | —SO$_2$— | Violet. |
| 42 | Y and Y':As in Example 40 | H | —NHCONH— | Brownish yellow. |
| 43 | Y and Y':1-(4'-hydroxy-3'-carboxyphenyl)-3-methyl-5-pyrazolone-5'-sulfonic acid | H | —NHCO— | Brownish orange. |
| 44 | Y and Y':As in Example 12 | SO$_3$H | >C$_6$H$_{10}$ | Violet. |
| 45 | Y and Y':4-acetoacetylamino-2-hydroxybenzoic acid | SO$_3$H | —C(CH$_3$)$_2$— | Golden yellow. |
| 46 | Y and Y':As in Example 9 | SO$_3$H | >CHCH$_3$ | Reddish brown. |
| 47 | Y and Y':As in Example 12 | SO$_3$H | —C(CH$_3$)$_2$— | Violet. |
| 48 | do | SO$_3$H | — | Do. |
| 49 | Y and Y':As in Example 9 | H | —C(CH$_3$)$_2$— | Reddish brown. |
| 50 | Y and Y':As in Example 11 | SO$_2$H | —C(CH$_3$)$_2$— | Orange. |
| 51 | Y and Y':As in Example 45 | SO$_3$H | —CH$_2$— | Brownish yellow. |

Example 52

44 parts of 3:3' - diamino-4:4'-dihydroxy-diphenylsulfone-5:5'-disulfonic acid are diazotized indirectly in known manner and combined at 0° with a solution of 80 parts of 2 - (4'-hydroxy-3'-carboxyphenylamino)-5-naphthol-7-sulfonic acid, 67 parts of sodium hydroxide solution (30%) and 50 parts of sodium carbonate in 400 parts of water. After termination of the coupling the resulting disazo dyestuff is separated off by the addition of sodium chloride, filtered and dried.

The resulting dyestuff dissolves in water to give a reddish violet colour and in concentrated sulfuric acid to give a bluish violet colour. The dyestuff yields in chrome printing on staple fiber a navy blue dyeing having very good fastness properties.

The diazo components used in this example are obtained by sulfonating 4:4'-dihydroxydiphenylsulfone with concentrated sulfuric acid, nitrating with mixed acid and reducing according to the Béchamp method.

If the coupling component is replaced in this example by equivalent amounts of 2:4-dihydroxy benzoic acid a brownish red dyeing is obtained, and, if 1-(4'-hydroxy-3'-carboxyphenyl)-3-methyl-5-pyrazolone is used, an orange dyeing having similar fastness properties is obtained.

Example 53

121.3 parts of the dyestuff according to Example 52 (molecular weight 1213) are dissolved in 2500 parts of water at 80° and diluted with 40 parts of cryst. copper acetate (molecular weight 199.7). The mixture is refluxed for 1 hour. The dyestuff is thereafter precipitated by the addition of sodium chloride, filtered at 80° and dried.

The resulting dyestuff which corresponds in the form of the free acid presumably to the formula printing on cotton, silk and wool a violet dyeing having excellent fastness to light and washing.

If equivalent amounts of nickel acetate are used in this example instead of the copper acetate, a dyestuff is obtained which has similar dyeing properties.

Example 54

121.3 parts of the dyestuff according to Example 52 (molecular weight 1213) are dissolved at 130° in 1500 parts of formamide. 25 parts of a chromium acetate containing 24.1% of chromium are thereafter added and the solution is stirred for 5 hours at 130°. After diluting with 500 parts of water, the dyestuff is precipitated by the addition of sodium chloride, filtered at 20° and dried.

The resulting dyestuff, which contains 1 atom of complex-bonded chromium on two azo groups, dissolves in water to give a blue colour, in concentrated sulfuric acid to give a bluish red colour and yields in chrome printing on cotton a bluish grey dyeing having excellent fastness to washing. Similar shades are obtained in chrome printing on a polyamide fabric.

Example 55

121.3 parts of the dyestuff according to Example 52 (molecular weight 1213) are dissolved at 70° in 2000 parts of water. A solution of 26 parts of cryst. cobalt acetate (molecular weight 249) in 1000 parts of water is allowed to drop in within 90 minutes and the solution is stirred for 60 minutes at 70°. The dyestuff is separated off by the addition of 800 parts of potassium chloride, filtered at 20° and dried.

The resulting dyestuff dissolves in water to give a violet-toned grey colour, in concentrated sulfuric acid

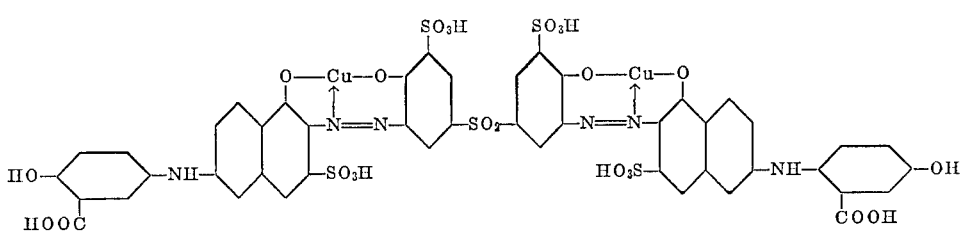

dissolves in water to give a violet colour, in concentrated sulfuric acid to give a red colour, and yields in chrome to give a bluish red colour and yield in chrome printing on cotton a reddish grey dyeing which is characterized by very good fastness to light and excellent fastness to washing.

Example 56

12.7 parts of the trisazo dyestuff from tetrazotized 4,4'-diaminoazo benzene and 1-(4'-hydroxy-3'-carboxybenzene sulfonylamino) - 8 - naphthol-3,6-disulfonic acid (molecular weight 1272) are dissolved at 50° in 1000 parts of water. After adding 5.5 parts of cryst. copper sulfate and 10 parts of cryst. sodium acetate, 2.7 parts of hydrogen peroxide (100%) dissolved in 150 parts of water are allowed to drip in at 50° during 2 hours. By the addition of 200 parts of potassium chloride, the resulting complex copper compound is separated off, filtered and dried.

The resulting dyestuff which presumably corresponds in the form of the free acid to the formula

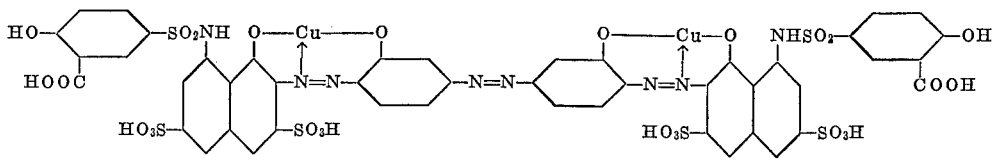

dissolves in water to give a bluish colour, in sulfuric acid to give a bluish grey colour and yields in chrome printing on cotton a fast greyish blue.

The same dyestuff is obtained by reducing the dyestuff from 1 mole of diazotized 5-nitro-2-aminoanisol and 1 mole of the coupling component used in this example with the aid of glucose and coppering the resulting trisazo dyestuff according to Example 6, thus demethylating the dyestuff.

Example 57

11.7 parts of the disazo dyestuff from 1 mole of tetrazotized 3,3'-dimethoxy-4,4'-diaminodiphenyl and 2 moles of 1-(2'-methyl - 4' - hydroxy-5'-carboxy-benzene sulfonylamino)-5-naphthol-7-sulfonic acid, 25 parts of ammonia (22%), 7 parts of cryst. copper sulfate and 200 parts of water are refluxed for 40 hours. The resulting copper complex compound is separated off by the addition of sodium chloride, filtered and 150 parts of water in the presence of 2.5 parts of nitrlotriacetic acid heated to 80° for 30 minutes. The dyestuff is recovered as usual.

The resulting dyestuff which in the form of the free acid presumably has the formula

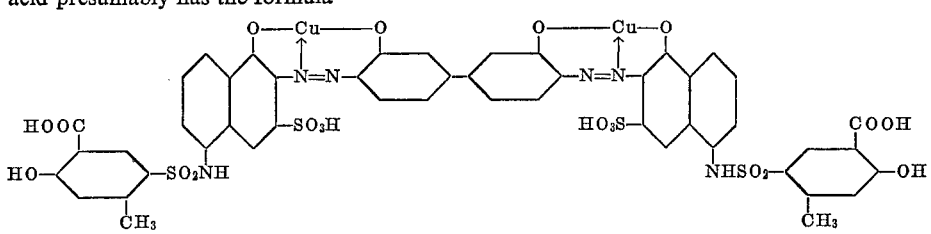

yields a light-fast blue when dyed directly on cotton. The fastness to washing of the dyeing is substantially improved by an after-treatment at 80° for 30 minutes in a bath containing 4% of chromium acetate and 4% of formic acid.

Example 58

The disazo dyestuff is prepared similarly to Example 2 by tetrazotizing 1 mole of the disulfuric acid semi-ester of 3,3' - dihydroxy-4,4' - diaminodiphenyl and coupling with 2 moles of 1-(4'-hydroxy-3'-carboxy-benzene-sulfonylamino) - 8 - naphthol - 3,6 - disulfonic acid. 14.4 parts of this disazo dyestuff (molecular weight 1436 moles) and 10 parts of sodium acetate are dissolved in 400 parts of water. An aqueous solution of chromium acetate containing 0.52 part of chromium is thereafter allowed to drip in and the mixture is refluxed for 10 hours. The dyestuff is separated off by the addition of potassium chloride, filtered and dried.

The resulting dyestuff dissolves in water to give a blue colour, in concentrated sulfuric acid to give a bluish green colour and yields in chrome printing on cotton a slightly greyish blue dyeing having very good fastness properties.

The same dyestuff is obtained according to the process described in Example 6, if the symmetrical disazo dyestuff obtained from tetrazotized 3,3'-dimethoxy-4,4'-diamino-diphenyl and from the coupling component used in the above example, is coppered, while demethylating, then decoppered and chromated.

If the chromium acetate is replaced in this example by 4 parts of crystallized copper acetate (molecular weight 199.7), a dyestuff is obtained which yields fast blue dyeings in chrome printing on cotton.

Example 59

7.7 parts of the dyestuff of the formula

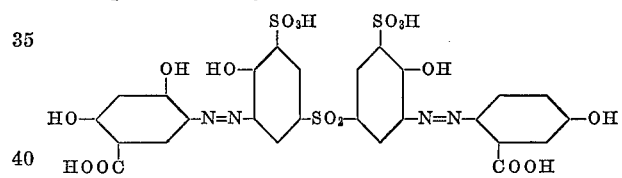

(molecular weight 770) and 10.9 parts of the dyestuff of the formula

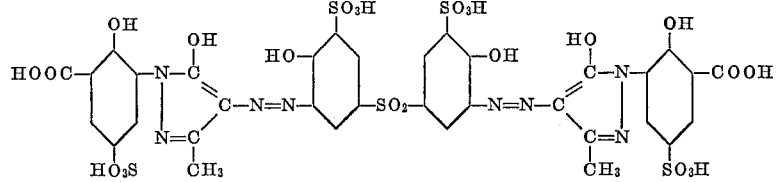

(molecular weight 1090) are dissolved in 300 parts of water. After adding an aqueous solution of chromium acetate containing 1.04 parts of chromium, one refluxes to boiling point until the chromation is terminated. The dyestuff is separated off by the addition of sodium chloride, filtered and dried.

The resulting dyestuff dissolves in water to give a brownish red colour, in concentrated sulfuric acid to give a yellow colour and yields in chrome printing on cotton a brownish red dyeing having excellent fastness properties to light and washing.

Further heavy metal complex azo dyestuffs obtained according to the processes described in the preceding examples are listed in the following table. In the column "Metal," the metal linked in a complex form with the o,o'-dihydroxyazo groups is given and in the column "Shade," the shade obtained in chrome printing on cotton, is shown.

Obtained by the action of copper-yielding agents in the presence of an oxidation agent analogous to Example 56.

What we claim is:

| Example | Tetrazo component (1 mole) | Coupling component (2 moles) | Metal | Shade |
|---|---|---|---|---|
| 60 | 3:3'-diamino-4,4'-dihydroxy-diphenyl-sulfone-5:5'-disulfonic acid. | 1-(2'-hydroxy-3'-carboxyphenyl)-3-methyl-5-pyrazolone 5'-sulfonic acid. | Cu | Yellow. |
| 61 | do | do | Co | Do. |
| 62 | do | do | Cr | Orange. |
| 63 | do | 2:4-dihydroxybenzoic acid | Cr | Brown. |
| 64 | do | 1-(4'-hydroxy-3'-carboxybenzene sulfonylamino)-8-naphthol-3:6-disulfonic acid. | Cu | Reddish violet. |
| 65 | do | do | Co | Greyish violet. |
| 66 | do | do | Cr | Reddish grey. |
| 67 | do | do | Ni | Reddish violet. |
| 68 | do | 2-(4'-hydroxy-3'-carboxybenzene-sulfonylamino)-8-naphthol-6-sulfonic acid. | Cu | Bordeaux. |
| 69 | do | do | Ni | Do. |
| 70 | do | do | Cr | Brownish. |
| 71 | do | 3-acetoacetylamino-2-hydroxybenzoic acid-5-sulfonic acid. | Cu | Brownish yellow. |
| 72 | Disulfuric acid semi-ester of 3:3'-dihydroxy-4:4'-diaminodiphenyl. | 2-(4'-hydroxy-3'-carboxybenzene-sulfonylamino)-8-naphthol-6-sulfonic acid. | Cu | Navy blue. |
| 73 | do | (1 mole) 2-(4'-hydroxy-3'-carboxyphenyl-amino)-5-naphthol-7-sulfonic acid and (1 mole) 1-(4'-hydroxy-3'-carboxybenzene-sulfonylamino)-8-naphthol-3:6-disulfonic acid. | Cu | Do. |
| 74 | Disulfuric acid semi-ester of 4:4'-dihydroxy-3:3'-diaminodiphenyl. | 1-(4'-hydroxy-3'-carboxybenzene-sulfonyl-amino)-8-naphthol-3:6-disulfonic acid. | Cu | Violet. |
| 75 | do | do | Co | Dull violet. |
| 76 | do | do | Cr | Do. |
| 77 | do | 1-(2'-hydroxy-3'-carboxyphenyl)-3-methyl-5-pyrazolone-5'-sulfonic acid. | Cu | Brown. |
| 78 | 4:4'-dihydroxy-3:3'-diaminodiphenylsulfone | 2-(4'-hydroxy-3'-carboxybenzene-sulfonylamino)-8-naphthol-6-sulfonic acid. | Cr | Reddish grey. |
| 79 | Disulfuric acid semi-ester of 2:2-(4':4'''-di-hydroxy-3':3'''-diamino-diphenyl)-propane. | 1-(4'-hydroxy-3'-carboxybenzene-sulfonyl-amino)-8-naphthol-3,6-disulfonic acid. | Cu | Violet. |
| 80 | do | do | Ni | Do. |
| 81 | do | do | Co | Dull violet. |
| 82 | do | do | Cr | Do. |
| 83 | 3:3'-dimethoxy-4:4'-diamino-diphenyl | 1-(2'-hydroxy-3'-carboxyphenyl)-3-methyl-5-pyrazolone-5'-sulfonic acid. | Cu | Violet. |
| 84 | do | 1-[4'-(4''-hydroxy-3'''-carboxy-benzene-sulfonylamino)-benzoylamino]-8-naphthol-4:6-disulfonic acid. | Cu | Blue. |
| 85 | 4:4'-diaminodiphenylamino-2-sulfonic acid | 2-(4'-hydroxy-3'-carboxybenzene-sulfonylamino)-5-naphthol-7-sulfonic acid. | Cu | Dull violet. |

1. A compound of the formula

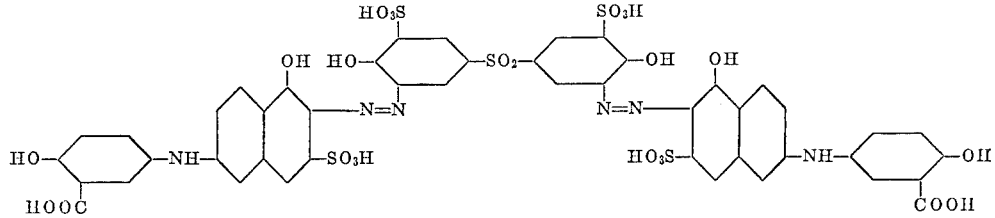

References Cited

UNITED STATES PATENTS

| 1,953,512 | 4/1934 | Sieglitz et al. | 260—178 |
| 2,204,230 | 6/1940 | Rossander et al. | 260—144 |
| 2,404,198 | 7/1946 | Straub et al. | 260—147 |
| 2,439,153 | 4/1948 | Straub et al. | 260—161 |
| 2,753,335 | 7/1956 | Wehrli | 260—148 |

CHARLES B. PARKER, Primary Examiner

DONALD M. PAPUGA, Assistant Examiner

U.S. Cl. X.R.

8—41, 42, 54.2; 260—145, 161, 169